(12) United States Patent
Lindemann

(10) Patent No.: US 8,973,357 B2
(45) Date of Patent: Mar. 10, 2015

(54) HUB SEAL

(75) Inventor: Patrick Lindemann, Wooster, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 908 days.

(21) Appl. No.: 13/182,852

(22) Filed: Jul. 14, 2011

(65) Prior Publication Data

US 2012/0011838 A1   Jan. 19, 2012

Related U.S. Application Data

(60) Provisional application No. 61/364,261, filed on Jul. 14, 2010.

(51) Int. Cl.
| F16D 33/00 | (2006.01) |
| F16J 15/32 | (2006.01) |
| F16H 41/30 | (2006.01) |
| F16H 45/02 | (2006.01) |

(52) U.S. Cl.
CPC ............. *F16J 15/3216* (2013.01); *F16H 41/30* (2013.01); *F16H 45/02* (2013.01); *F16H 2045/0226* (2013.01)
USPC .............................. 60/330; 277/500; 277/579

(58) Field of Classification Search
CPC ........................... F16H 2045/021; F16D 33/18
USPC .................... 60/330, 338; 277/500, 579, 580
See application file for complete search history.

(56) References Cited

U.S. PATENT DOCUMENTS

| 6,247,568 | B1 * | 6/2001 | Takashima et al. ........ 192/70.12 |
| 6,338,491 | B1 | 1/2002 | Vater et al. |
| 7,516,612 | B2 | 4/2009 | Schoenek |
| 7,992,694 | B2 * | 8/2011 | Krause et al. ................ 192/3.29 |
| 2008/0191422 | A1 * | 8/2008 | Schoenek ..................... 277/316 |
| 2010/0194052 | A1 * | 8/2010 | Orlowski et al. ............. 277/413 |

* cited by examiner

*Primary Examiner* — Nathaniel Wiehe
*Assistant Examiner* — Abiy Teka
(74) *Attorney, Agent, or Firm* — Kathryn A. Warner; Kevin L. Parks

(57) ABSTRACT

A hub seal assembly includes a hub having a groove with a first radial wall, a first floating seal including a second radial wall, and a resilient element. The first floating seal is axially displaced by the resilient element so that the second radial wall contacts the first radial wall. In an example embodiment, the first floating seal includes polytetrafluoroethylene. In some example embodiments, the resilient element is an o-ring. In an example embodiment, the first floating seal includes a circumferential groove or a notch and the o-ring is at least partially disposed in the groove or the notch.

14 Claims, 5 Drawing Sheets

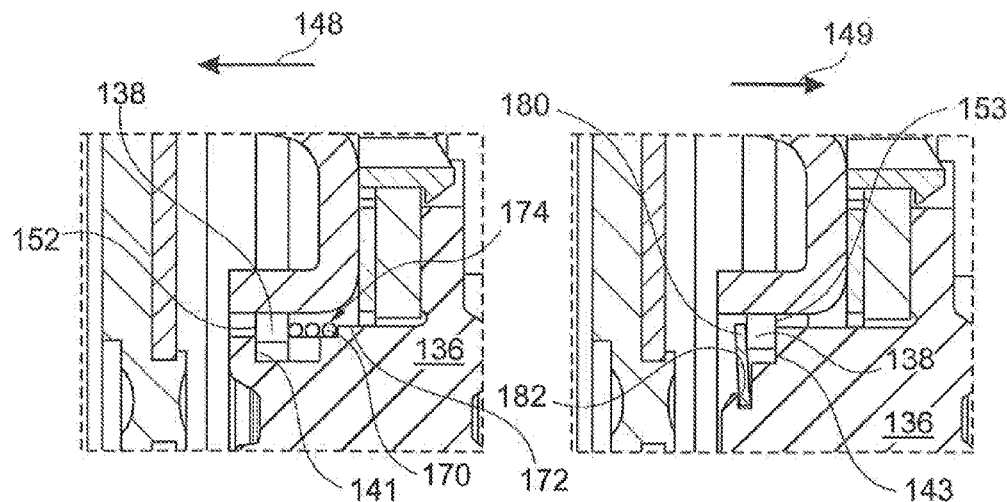
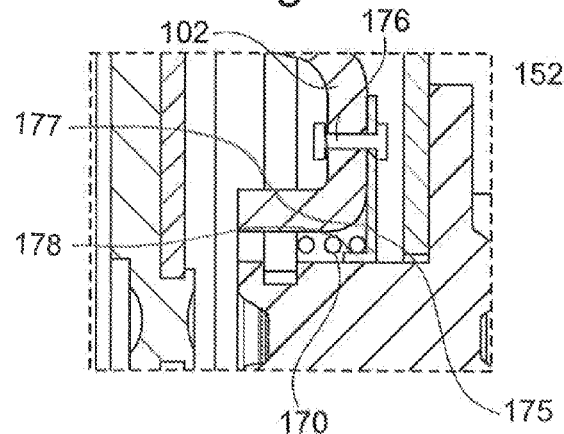
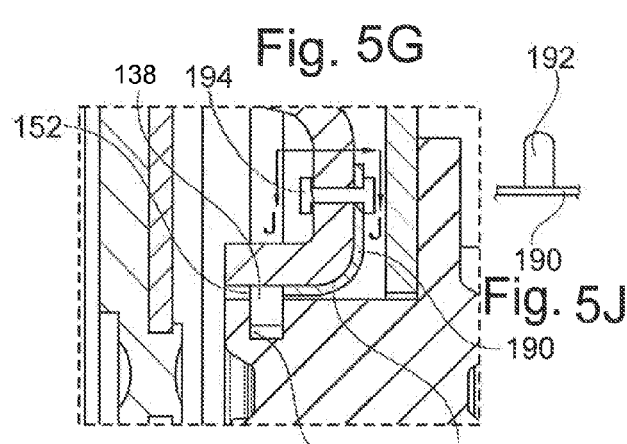
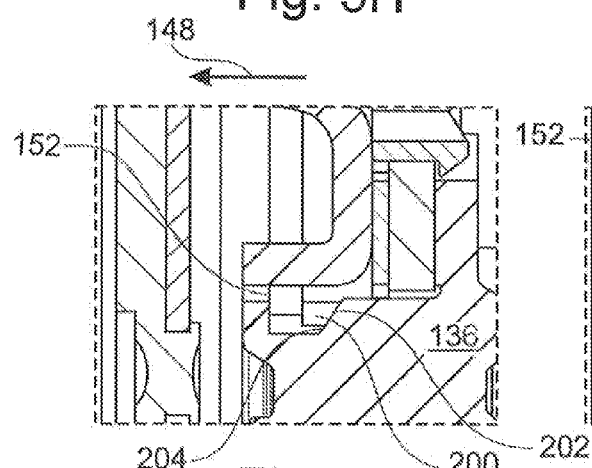
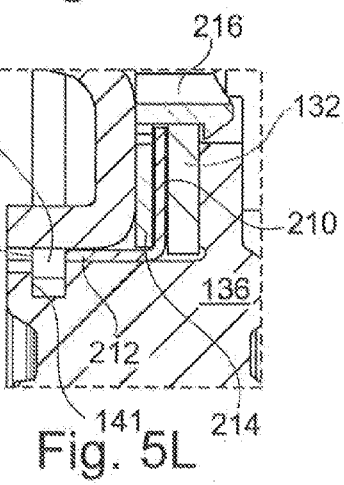

HUB SEAL

FIELD

The invention relates generally to a hub seal assembly, and more specifically to a hub seal assembly having a floating seal and a resilient element.

BACKGROUND

FIG. 2 is a top-half section view of torque converter 100 with a prior art hub seal configuration.

FIG. 3 is a detail view of region 3 in FIG. 2 with an enlarged groove shown for clarity. The following should be viewed in light of FIGS. 2 and 3. Hub seals are known. Converter 100 is a twin plate design. That is, converter 100 includes piston plate 102 drivingly connected to cover 104 through leaf springs 106 and drive plate 108. Cover 104 is drivingly connected to a prime mover (not shown), such as an automobile engine, at lugs 110. Therefore, piston plate 102 is rotationally connected to the engine through cover 104.

Drive plate 112 is axially disposed between piston plate 102 and cover 104 so that hydraulic pressure acting on piston plate 102 clamps drive plate 112 between piston 102 and cover 104. Piston 102, cover 104 and drive plate 112 may be collectively referred to as clutch assembly 114. When clutch assembly 114 is engaged, torque from cover 104 is transmitted to damper 116 through tabs 118 of drive plate 112. Tabs 118 engage complementary tabs 120 of cover plate 122 and torque is transmitted from plates 122 and 124 through springs 126 to plates 128 and 130. Torque from plates 128 and 130 is transmitted to flange 132 through springs 134 and 135. Flange 132 is fixed to hub 136 by riveting, staking, or welding, for example. Hub 136 is drivingly engaged with an input shaft (not shown) of a transmission (not shown) at splines 137. Therefore, when clutch 114 is engaged, torque from the engine is transmitted to the input shaft through damper 116 and hub 136. Piston plate 102 and hub 136 have the same relative speed except for minimal differences due to fluctuation in damper 116.

When the vehicle is stopped, there is a considerable rotational speed difference between piston 102 and hub 136. For example, when clutch 114 is disengaged and the vehicle is stopped, the engine rotational speed (and the piston rotational speed) may be 800 revolutions per minute (RPMs) or more, while the input shaft rotational speed (and the hub rotational speed) is 0 RPMs. Therefore, seal 138, disposed in groove 140 and acting between piston 102 and hub 136, must be specially designed for high relative speeds. For example, seal 138 may be a square-cut or rectangular-cut floating seal made of polytetrafluoroethylene (PTFE). By floating, I mean that the seal is disposed in groove 140 but is not compressed by radial walls 141 and 143 of groove 140. That is, width 142 of seal groove 140 is greater than width 144 of floating seal 138 so that seal 138 is not tightly retained by groove 140. Floating seals are generally preferred over compression seals to seal components with high relative speeds.

Seal 138 is disposed in groove 140. Width 142 of groove 140 is greater than width 144 of seal 138 to ensure proper assembly of seal 138. When hydraulic pressure is introduced to apply piston 102 and engage clutch 114, some oil can leak past seal 138 as indicated by arrow 146. This leakage degrades performance and reaction time of clutch 114. Furthermore, once pressure builds seal 138 may move abruptly in direction of arrow 148 resulting in a rapid pressure rise and harsh engagement of clutch 114.

BRIEF SUMMARY

Example aspects broadly comprise a hub seal assembly including a hub having a groove with a first radial wall, a first floating seal including a second radial wall, and a resilient element. The first floating seal is axially displaced by the resilient element so that the second radial wall contacts the first radial wall. In an example embodiment, the first floating seal includes polytetrafluoroethylene. In some example embodiments, the resilient element is an o-ring. In an example embodiment, the first floating seal includes a circumferential groove or a notch and the o-ring is at least partially disposed in the groove or the notch.

In an example embodiment, the hub seal assembly includes a second floating seal. The resilient element is disposed between the first and second floating seals. In some example embodiments, the resilient element includes a coil spring. In an example embodiment, the hub includes a notch and the coil spring is axially retained by the notch.

In some example embodiments, the hub seal includes a piston plate. The piston plate includes a first circumferential surface and the first floating seal includes a second circumferential surface in contact with the first circumferential surface. In an example embodiment, the hub seal includes a backing ring attached to the piston plate. The resilient element includes a coil spring and the backing ring axially retains the coil spring. In an example embodiment, the resilient element includes a diaphragm spring.

In some example embodiments, the hub seal assembly includes an annular ring with an axial tab extending therefrom, and the axial tab includes the resilient element. In an example embodiment, the hub seal assembly includes a piston plate and the annular ring is attached to the piston plate. In some example embodiments, the annular ring is axially retained by the hub. In an example embodiment, the hub seal assembly includes a flange fixed to the hub and a thrust washer attached to the flange. The annular ring is disposed between the flange and the thrust washer.

In some example embodiments, the hub seal assembly includes a snap ring with a first angled surface. The groove includes a second angled surface matingly engaged with the first angled surface and the snap ring includes the resilient element. In an example embodiment, engagement of the first angled surface with the second angled surface urges the snap ring towards the first seal.

Other example aspects broadly comprise a torque converter including a cover arranged for driving engagement with a prime mover, a piston plate drivingly engaged with the cover, a hub including a circumferential groove with a first width and a radial wall, and a dynamic seal disposed at least partially in the circumferential groove. The dynamic seal includes a circumferential surface contacting the piston plate, a surface in constant contact with the radial wall, and a second width less than the first width. In an example embodiment, the dynamic seal is urged into contact with the radial wall by an o-ring, a coil spring, a diaphragm spring, or an axial tab of an annular ring. In an example embodiment, the torque converter includes a wedge element at least partially disposed in the groove. The groove includes a first conical surface, the wedge element includes a second conical surface in contact with the first conical surface, and the wedge element is radially expanded by contact with the dynamic seal and the first conical surface.

Other example aspects broadly comprise a torque converter including a cover arranged for driving engagement with a prime mover, a piston plate drivingly engaged with the cover, a hub forming an output for the torque converter and including a circumferential groove with a first width and a radial wall, a dynamic seal and a resilient element. The dynamic seal is disposed at least partially in the circumferential groove and includes a second width less than the first width, a first surface engaged with the radial wall, and a circumferential surface engaged with the piston plate. The resilient element urges the first surface into contact with the radial wall and is selected from the group consisting of an o-ring, a coil spring, a diaphragm spring, and an axial tab of an annular ring.

BRIEF DESCRIPTION OF THE DRAWINGS

The nature and mode of operation of the present invention will now be more fully described in the following detailed description of the invention taken with the accompanying drawing figures, in which:

FIG. 5F is a detail view of region 5 in FIG. 4 with a seal design including a coil spring, according to an example aspect;

FIG. 5G is a detail view of region 5 in FIG. 4 with a seal design including a diaphragm spring, according to an example aspect;

FIG. 5H is a detail view of region 5 in FIG. 4 with a seal design including a coil spring and backing ring, according to an example aspect;

FIG. 5I is a detail view of region 5 in FIG. 4 with a seal design including an annular ring, according to an example aspect;

FIG. 5J is a radial view of the annular ring of FIG. 5I taken generally along line J-J in FIG. 5I;

FIG. 5K is a detail view of region 5 in FIG. 4 with a seal design including an snap ring, according to an example aspect;

FIG. 5L is a detail view of region 5 in FIG. 4 with a seal design including an annular ring and a thrust washer, according to an example aspect.

DETAILED DESCRIPTION

At the outset, it should be appreciated that like drawing numbers appearing in different drawing views identify identical, or functionally similar, structural elements. Furthermore, it is understood that this invention is not limited only to the particular embodiments, methodology, materials and modifications described herein, and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the following example methods, devices, and materials are now described.

Figure 1A:
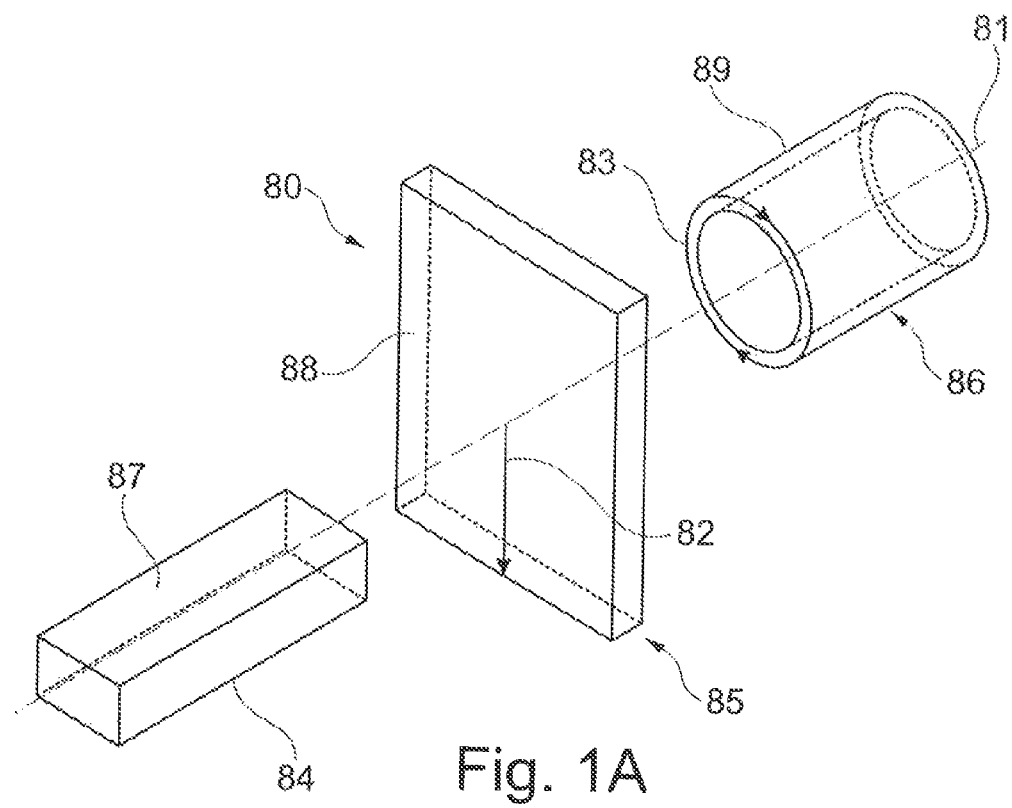
FIG. 1A is a perspective view of a cylindrical coordinate system demonstrating spatial terminology used in the present application.

FIG. 1A is a perspective view of cylindrical coordinate system 80 demonstrating spatial terminology used in the present application. The present invention is at least partially described within the context of a cylindrical coordinate system. System 80 has a longitudinal axis 81, used as the reference for the directional and spatial terms that follow. The adjectives "axial," "radial," and "circumferential" are with respect to an orientation parallel to axis 81, radius 82 (which is orthogonal to axis 81), and circumference 83, respectively. The adjectives "axial," "radial" and "circumferential" also are regarding orientation parallel to respective planes. To clarify the disposition of the various planes, objects 84, 85, and 86 are used. Surface 87 of object 84 forms an axial plane. That is, axis 81 forms a line along the surface. Surface 88 of object 85 forms a radial plane. That is, radius 82 forms a line along the surface. Surface 89 of object 86 forms a circumferential plane. That is, circumference 83 forms a line along the surface. As a further example, axial movement or disposition is parallel to axis 81, radial movement or disposition is parallel to radius 82, and circumferential movement or disposition is parallel to circumference 83. Rotation is with respect to axis 81.

The adverbs "axially," "radially," and "circumferentially" are with respect to an orientation parallel to axis 81, radius 82, or circumference 83, respectively. The adverbs "axially," "radially," and "circumferentially" also are regarding orientation parallel to respective planes.

Figure 1B:
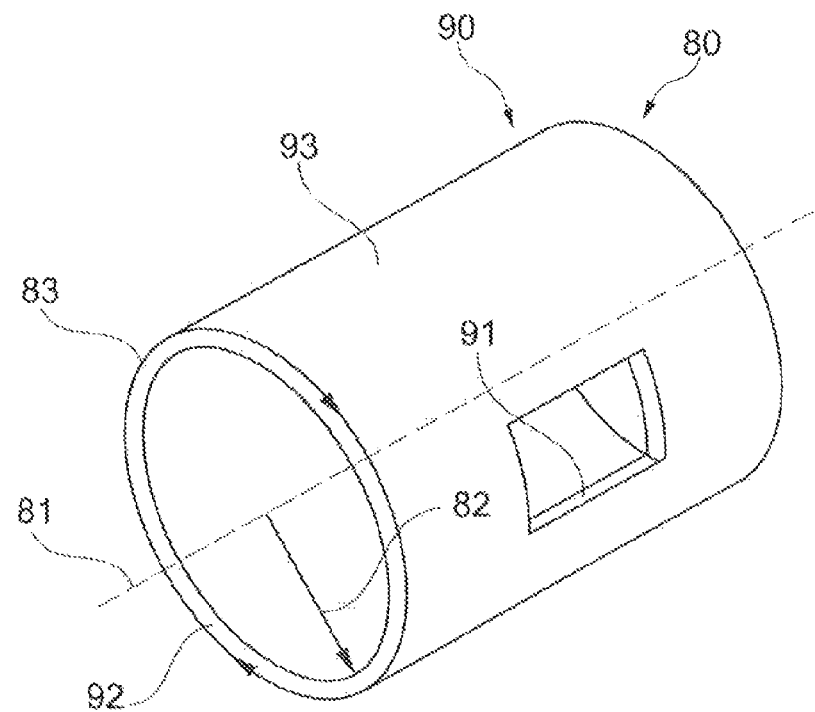
FIG. 1B is a perspective view of an object in the cylindrical coordinate system of FIG. 1A demonstrating spatial terminology used in the present application.

FIG. 1B is a perspective view of object 90 in cylindrical coordinate system 80 of FIG. 1A demonstrating spatial terminology used in the present application. Cylindrical object 90 is representative of a cylindrical object in a cylindrical coordinate system and is not intended to limit the present invention in any manner. Object 90 includes axial surface 91, radial surface 92, and circumferential surface 93. Surface 91 is part of an axial plane, surface 92 is part of a radial plane, and surface 93 is part of a circumferential surface.

Figure 5A:
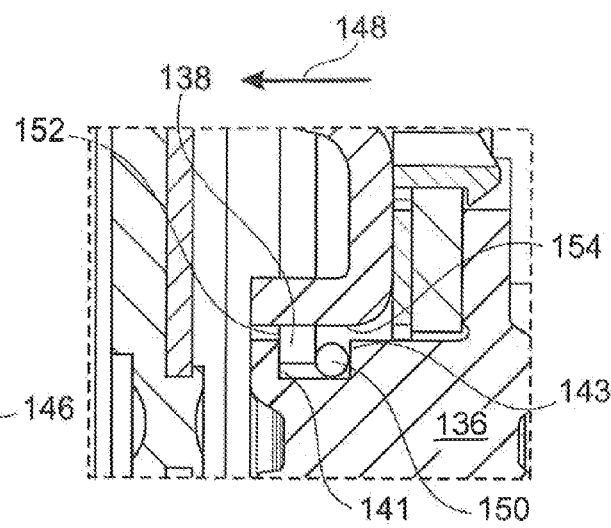
FIG. 5A is a detail view of region 5 in FIG. 4 with a seal design including an o-ring, according to an example aspect.
Figure 4:
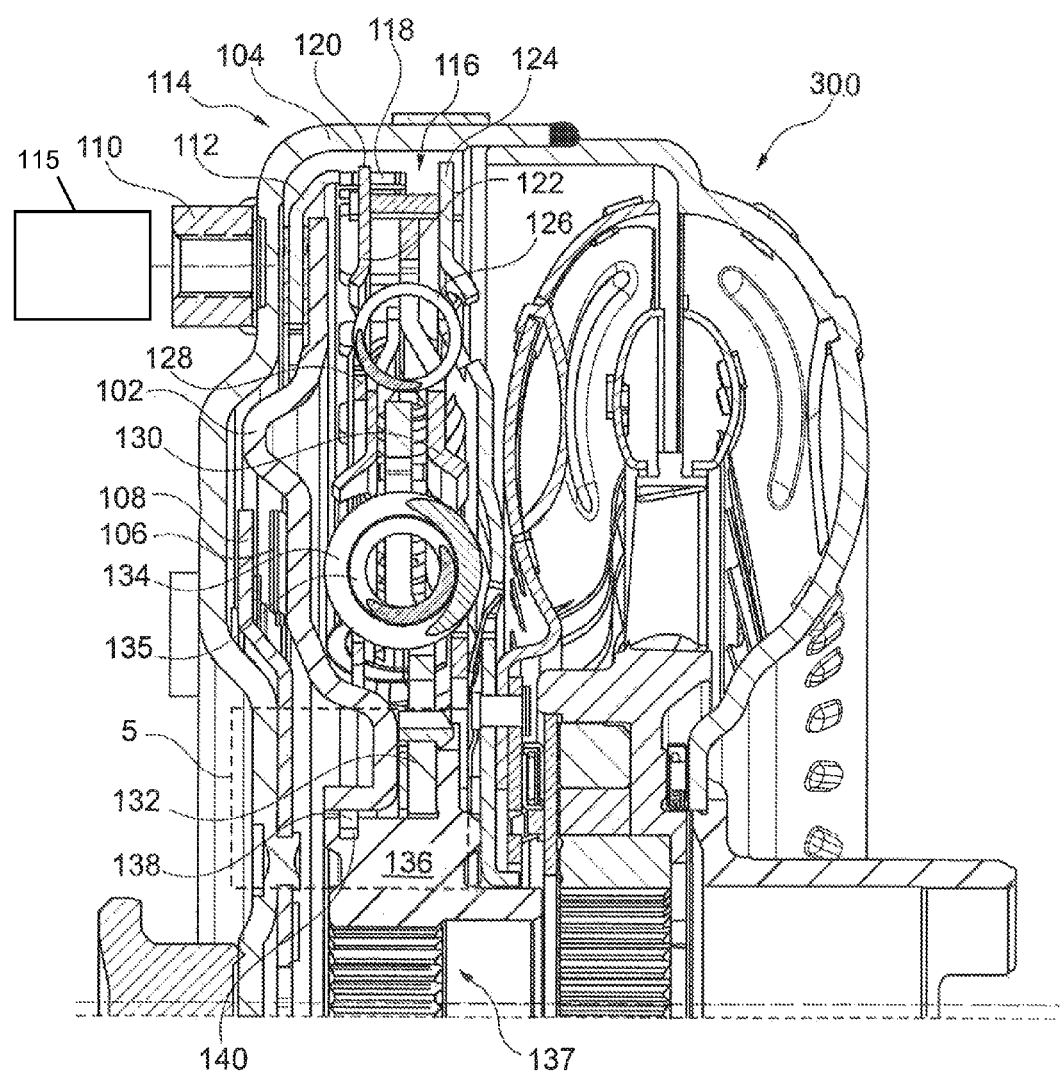
FIG. 4 is a top-half section view of a torque converter with a hub seal configuration.

The following description is made with reference to FIGS. 4 and 5A. FIG. 4 is a top-half section view of torque converter 300 with a hub seal configuration and prime mover 115. FIG. 5A is a detail view of region 5 in FIG. 4 with a seal design including an o-ring, according to an example aspect. Seal 138 is urged in direction of arrow 148 by resilient element 150. Element 150 may be a rubber o-ring, for example. Element 150 urges seal radial wall 152 into contact with groove radial wall 141 to restrict flow of oil as described supra. That is, seal 138 is sealingly engaged with hub 136, thereby improving engagement of clutch 114. Element 150 is compressed in groove 140 between seal 138 and radial wall 143. Seal 138 also seals to piston 102 at circumferential wall 154 of piston 102.

Figure 5B:
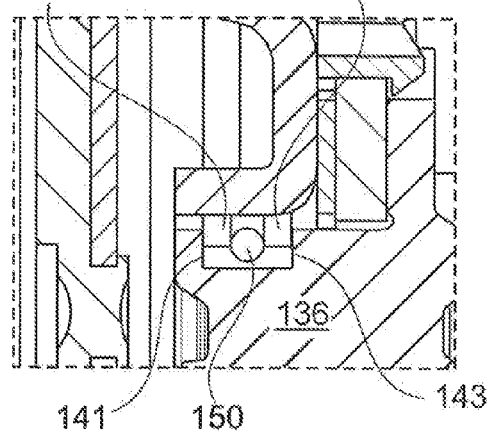
FIG. 5B is a detail view of region 5 in FIG. 4 with a seal design including two floating seals and an o-ring, according to an example aspect.
Figure 5C:
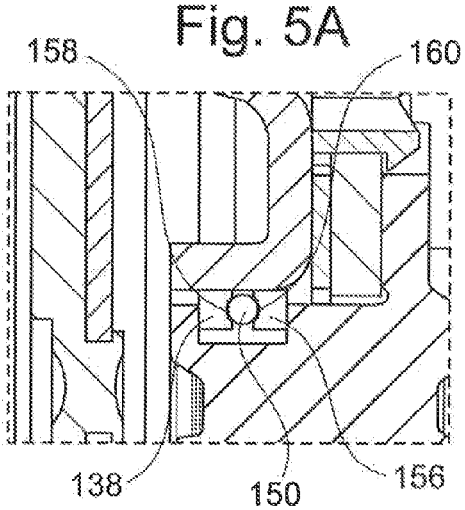
FIG. 5C is a detail view of region 5 in FIG. 4 with a seal design including two floating seals with circumferential grooves and an o-ring, according to an example aspect.
Figure 5D:
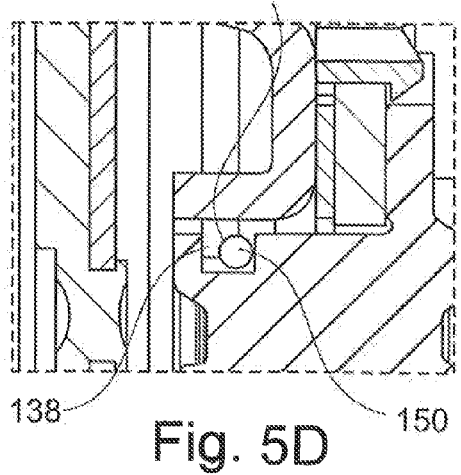
FIG. 5D is a detail view of region 5 in FIG. 4 with a seal design including a floating seals with a fillet and an o-ring, according to an example aspect.
Figure 5E:
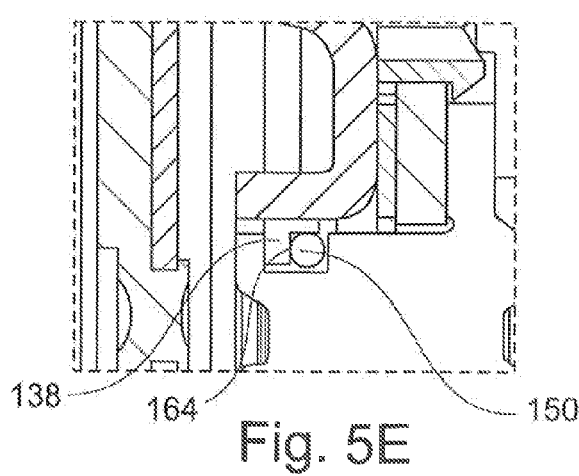
FIG. 5E is a detail view of region 5 in FIG. 4 with a seal design including a floating seals with a notch and an o-ring, according to an example aspect

The following description is made with reference to FIG. 5B-5E. FIG. 5B is a detail view of region 5 in FIG. 4 with a seal design including two floating seals and an o-ring, according to an example aspect. FIG. 5C is a detail view of region 5 in FIG. 4 with a seal design including two floating seals with circumferential grooves and an o-ring, according to an example aspect. FIG. 5D is a detail view of region 5 in FIG. 4 with a seal design including a floating seals with a fillet and an o-ring, according to an example aspect. FIG. 5E is a detail view of region 5 in FIG. 4 with a seal design including a floating seals with a notch and an o-ring, according to an example aspect.

The description of the embodiment shown in FIG. 5A is generally applicable to the embodiments shown in FIG. 5B-5E except as described below. In FIGS. 5B and 5C, seal 156 is disposed between resilient element 150 and radial wall 143. Element 150 is compressed between seal 138 and seal 156. In FIG. 5C, seals 138 and 156 include respective circumferential grooves 158 and 160 for receiving element 150. In FIG. 5D, seal 138 includes fillet 162 for receiving element 150. In FIG. 5E, seal 138 includes notch 164 for receiving element 150.

Figure 2:
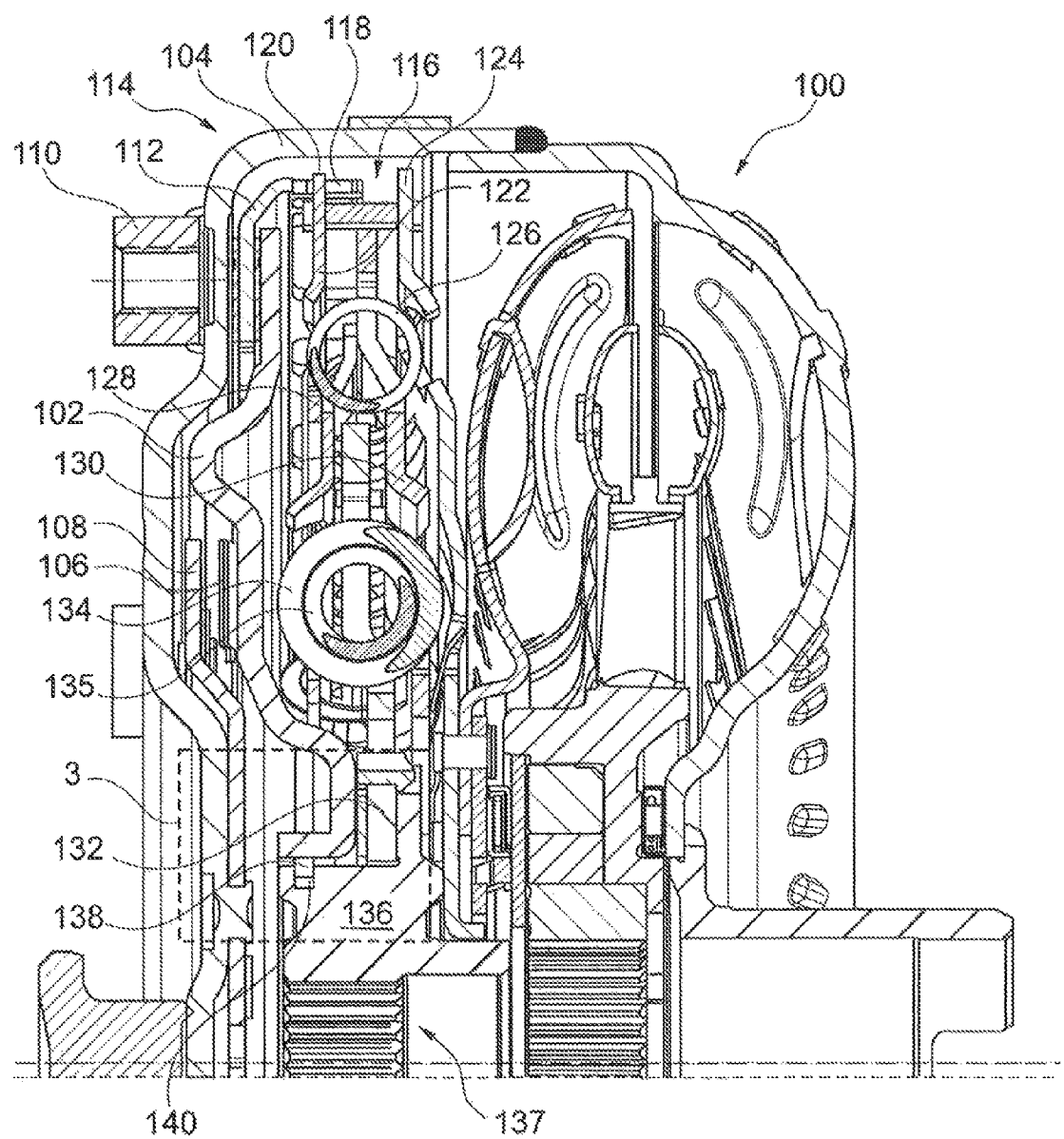
FIG. 2 is a top-half section view of a torque converter with a prior art hub seal configuration.
Figure 3:
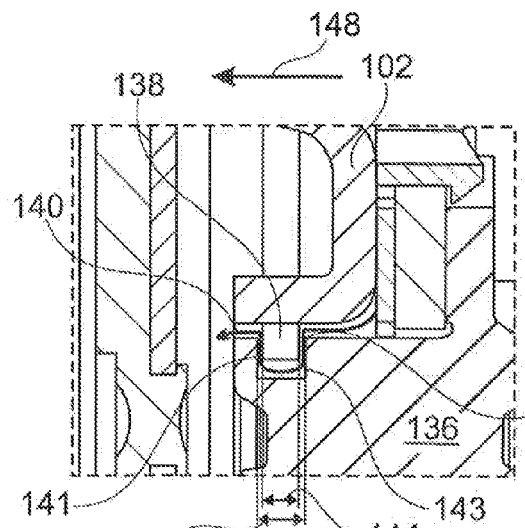
FIG. 3 is a detail view of region 3 in FIG. 2 with an enlarged groove shown for clarity.

The following description is made with reference to FIGS. 4 and 5F. FIG. 5F is a detail view of region 3 in FIG. 2 with a seal design including a coil spring, according to an example aspect. Seal 138 is urged in direction of arrow 148 by resilient element 170. Element 170 may be a coil spring, for example. Element 170 urges seal radial wall 152 into contact with groove radial wall 141 to restrict flow of oil as described supra. That is, seal 138 is sealingly engaged with hub 136, thereby improving engagement of clutch 114. Element 170 is compressed between seal 138 and radial wall 172 of notch 174. That is, hub 136 includes notch 174 for axially retaining coil spring 170.

The following description is made with reference to FIGS. 4 and 5G. FIG. 5G is a detail view of region 5 in FIG. 4 with a seal design including a diaphragm spring, according to an example aspect. Seal 138 is urged in direction of arrow 149 by resilient element 180. Element 180 may be a diaphragm spring, for example. Element 180 urges seal radial wall 153 into contact with groove radial wall 143 to restrict flow of oil as described supra. That is, seal 138 is sealingly engaged with hub 136, thereby improving engagement of clutch 114. Element 180 is compressed between seal 138 and radial wall 182 of hub 136. Wall 182 may be created by staking. That is, element 180 may be staked to hub 136.

The following description is made with reference to FIG. 5H. FIG. 5H is a detail view of region 5 in FIG. 4 with a seal design including a coil spring and backing ring, according to an example aspect. The description of the embodiment shown in FIG. 5F is generally applicable to the embodiment shown in FIG. 5H except as described below. Piston plate 102 includes backing ring 175. Ring 175 may be attached to piston 102 by rivet 176, for example. Ring 175 includes radial wall 177 and circumferential wall 178. Element 170 is axially retained by wall 177 and radially centered by wall 178.

The following description is made with reference to FIGS. 5I-5J. FIG. 5I is a detail view of region 5 in FIG. 4 with a seal design including an annular ring, according to an example aspect. FIG. 5J is a radial view of the annular ring of FIG. 5I taken generally along line J-J in FIG. 5I. Piston plate 102 includes annular ring 190 with axial tab 192. Ring 190 may be attached to piston plate 102 by rivet 194, for example. Axial tab 192 extends from ring 190 towards seal 138. Tab 192 urges seal radial wall 152 into contract with groove radial wall 141 to restrict flow of oil as described supra. That is, seal 138 is sealingly engaged with hub 136, thereby improving engagement of clutch 114.

The following description is made with reference to FIG. 5K. FIG. 5K is a detail view of region 5 in FIG. 4 with a seal design including an snap ring, according to an example aspect. Seal 138 is urged in direction of arrow 148 by resilient element 200. Element 200 may be a snap ring, for example. Element 200 urges seal radial wall 152 into contact with groove radial wall 141 to restrict flow of oil as described supra. That is, seal 138 is sealingly engaged with hub 136, thereby improving engagement of clutch 114. Element 200 is disposed in groove 140 between seal 138 and angled surface 204 of groove 140. Angled, or conical, surface 202 of ring 200 is matingly engaged with angled surface 204. Engagement of groove angled surface 204 with snap ring angled surface 202 urges snap ring 200 towards seal 138. That is, snap ring 200 is a split ring expanded to fit into groove 140, so tendency of ring 200 to contract urges ring 200 in the direction of arrow 148 due to interaction of angled surfaces 202 and 204.

The following description is made with reference to FIGS. 4 and 5L. FIG. 5L is a detail view of region 5 in FIG. 4 with a seal design including an annular ring and a thrust washer, according to an example aspect. Hub 136 includes annular ring 210 with axial tab 212 disposed between flange 132 and thrust washer 214. Washer 214 is attached to flange 132 with tabs 216, for example. Axial tab 212 extends from ring 210 towards seal 138. Tab 212 urges seal radial wall 152 into contract with groove radial wall 141 to restrict flow of oil as described supra. That is, seal 138 is sealingly engaged with hub 136, thereby improving engagement of clutch 114.

Of course, changes and modifications to the above examples of the invention should be readily apparent to those having ordinary skill in the art, without departing from the spirit or scope of the invention as claimed. Although the invention is described by reference to specific preferred and/or example embodiments, it is clear that variations can be made without departing from the scope or spirit of the invention as claimed.

What I claim is:

1. A hub seal assembly comprising:
    a hub comprising a groove with a first radial wall;
    a first floating seal including a second radial wall;
    a resilient element, wherein the first floating seal is axially displaced by the resilient element so that the second radial wall contacts the first radial wall; and,
    a second floating seal, wherein the resilient element is disposed between the first and second floating seals.

2. The hub seal assembly of claim 1, wherein the first floating seal comprises polytetrafluoro ethylene.

3. The hub seal assembly of claim 1, wherein the resilient element is an o-ring.

4. The hub seal assembly of claim 3, wherein the first floating seal includes a circumferential groove or a notch and the o-ring is at least partially disposed in the groove or the notch.

5. The hub seal assembly of claim 1 wherein the resilient element includes a coil spring.

6. The hub seal assembly of claim 5 wherein the hub comprises a notch and the coil spring is axially retained by the notch.

7. A torque converter comprising:
a cover arranged for driving engagement with a prime mover;
a piston plate drivingly engaged with the cover; and,
the hub seal assembly of claim 1.

8. A hub seal assembly comprising:
a hub comprising a groove with a first radial wall;
a first floating seal including a second radial wall;
a resilient element, wherein the first floating seal is axially displaced by the resilient element so that the second radial wall contacts the first radial wall;
a piston plate, wherein:
the piston plate includes a first circumferential surface; and,
the first floating seal includes a second circumferential surface in contact with the first circumferential surface; and,
a backing ring attached to the piston plate, wherein:
the resilient element includes a coil spring; and,
the backing axially retains the coil spring.

9. The hub seal assembly of claim 8, wherein the first floating seal comprises polytetrafluoro ethylene.

10. A torque converter comprising:
a cover arranged for driving engagement with a prime mover;
the hub seal assembly of claim 8; and,
wherein the piston plate is drivingly engaged with the cover.

11. The hub seal assembly comprising:
a hub comprising a groove with a first radial wall;
a first floating seal including a second radial wall;
a resilient element wherein the first floating seal is axiall dis laced b the resilient element so that the second radial wall contacts the first radial wall;
a snap ring with a first angled surface, wherein:
the groove comprises a second angled surface matingly engaged with the first angled surface; and,
the snap ring comprises the resilient element.

12. The hub seal assembly of claim 11, wherein engagement of the first angled surface with the second angled surface urges the snap ring towards the first seal.

13. The hub seal assembly of claim 11, wherein the first floating seal comprises polytetrafluoro ethylene.

14. A torque converter comprising:
a cover arranged for driving engagement with a prime mover;
a piston plate drivingly engaged with the cover; and
the hub seal assembly of claim 11.

* * * * *